(12) United States Patent
King

(10) Patent No.: US 10,493,894 B2
(45) Date of Patent: Dec. 3, 2019

(54) SYSTEMS FOR VEHICLE LOAD MANAGEMENT

(71) Applicant: Joshua King, Sparta, TN (US)

(72) Inventor: Joshua King, Sparta, TN (US)

( * ) Notice: Subject to any disclaimer, the term of this patent is extended or adjusted under 35 U.S.C. 154(b) by 268 days.

(21) Appl. No.: 15/799,967

(22) Filed: Oct. 31, 2017

(65) Prior Publication Data

US 2019/0126805 A1 May 2, 2019

(51) Int. Cl.
| | | |
|---|---|---|
| *B60P 1/64* | (2006.01) | |
| *B62D 55/06* | (2006.01) | |
| *B62D 55/12* | (2006.01) | |
| *B66F 3/24* | (2006.01) | |

(52) U.S. Cl.
CPC ............ *B60P 1/6445* (2013.01); *B60P 1/649* (2013.01); *B62D 55/06* (2013.01); *B62D 55/12* (2013.01); *B66F 3/24* (2013.01)

(58) Field of Classification Search
CPC ........ B60P 1/6445; B60P 1/649; B62D 55/06; B62D 55/12; B66F 3/24
See application file for complete search history.

(56) References Cited

U.S. PATENT DOCUMENTS

| | | | | |
|---|---|---|---|---|
| 5,004,060 A * | 4/1991 | Barbagli | ............... | B62D 11/10 180/6.44 |
| 5,899,541 A * | 5/1999 | Ying | .................... | B62D 55/125 305/115 |
| 5,938,301 A * | 8/1999 | Hostetler | ............... | B62D 55/12 305/110 |
| 6,907,951 B2 * | 6/2005 | Schoenfelder | ......... | B62M 27/02 180/190 |
| 8,844,665 B2 * | 9/2014 | Wenger | .................. | B62D 5/063 180/193 |
| 2006/0237239 A1 * | 10/2006 | Bruner | ...................... | B62B 3/02 180/6.7 |
| 2008/0258550 A1 * | 10/2008 | Webster | ................. | B62D 55/02 305/129 |
| 2011/0061959 A1 * | 3/2011 | Watling | ................. | B62D 55/07 180/190 |
| 2018/0105217 A1 * | 4/2018 | Stellman | ............... | B62D 55/30 |

* cited by examiner

*Primary Examiner* — Saul Rodriguez
*Assistant Examiner* — Ashley K Romano
(74) *Attorney, Agent, or Firm* — Fred Lane Martin

(57) ABSTRACT

Systemized controls, apparatus, and mechanisms for unloading or loading portable buildings or equipment with respect to a flatbed trailer or an open, flat hauling platform are provided by a load management system. Loads such as prefabricated sheds are loaded safely without damage onto a trailer for hauling to from locations which may have hostile terrain in the vicinity of pick-up or final placement. The load management system provides a series of powered continuous tracks and lifting devices used to extend the load management system to the ground and lift the trailer until its wheels lose contact with the ground. The load management system uses powered continuous tracks to move the trailer over potentially hostile terrain to an unloading location. Conversely, the load management system can be used for loading a shed for secondary moving or repossession. During transit the load management system remains locked into a retracted safe configuration.

1 Claim, 12 Drawing Sheets

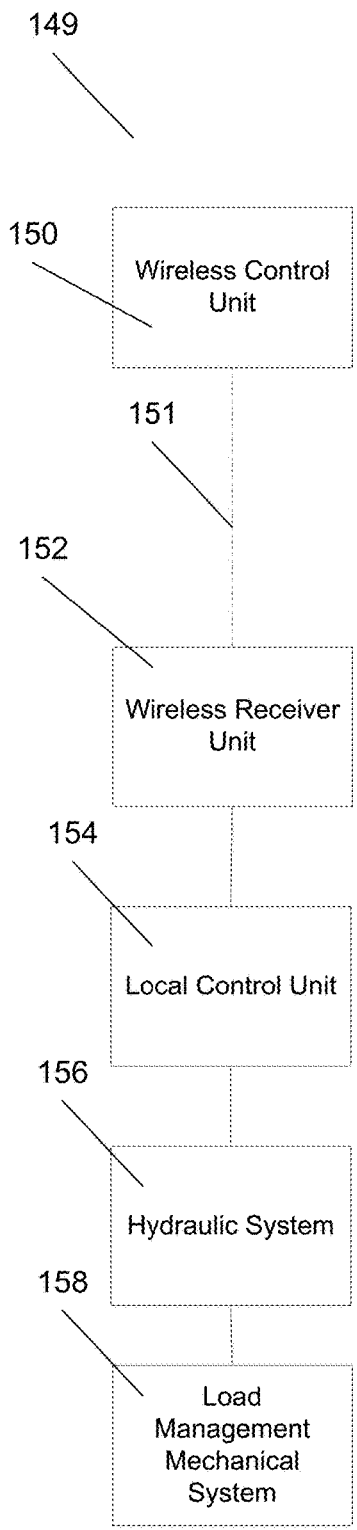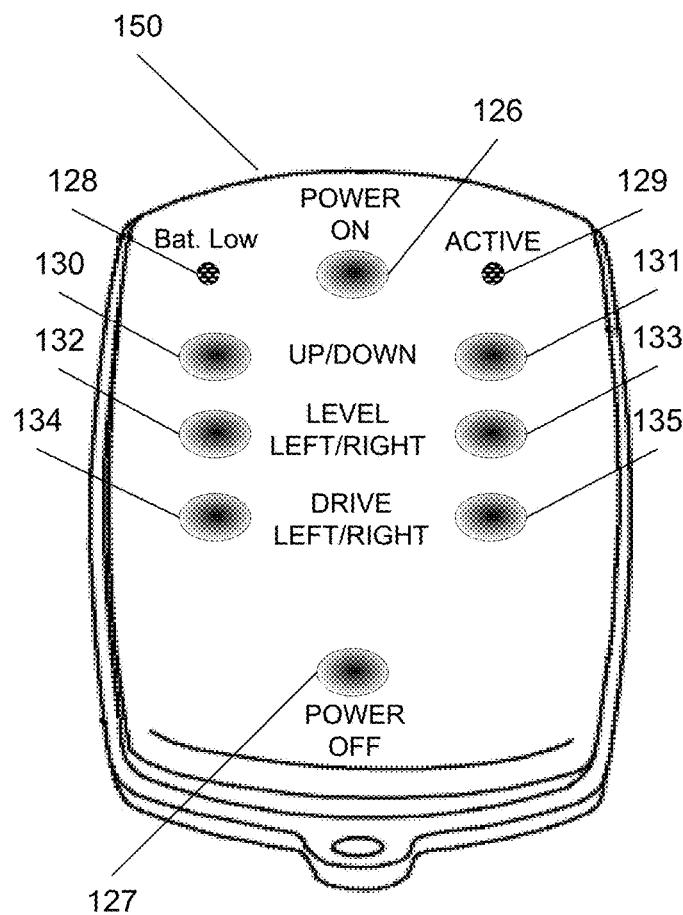
FIG. 1A
FIG. 1B

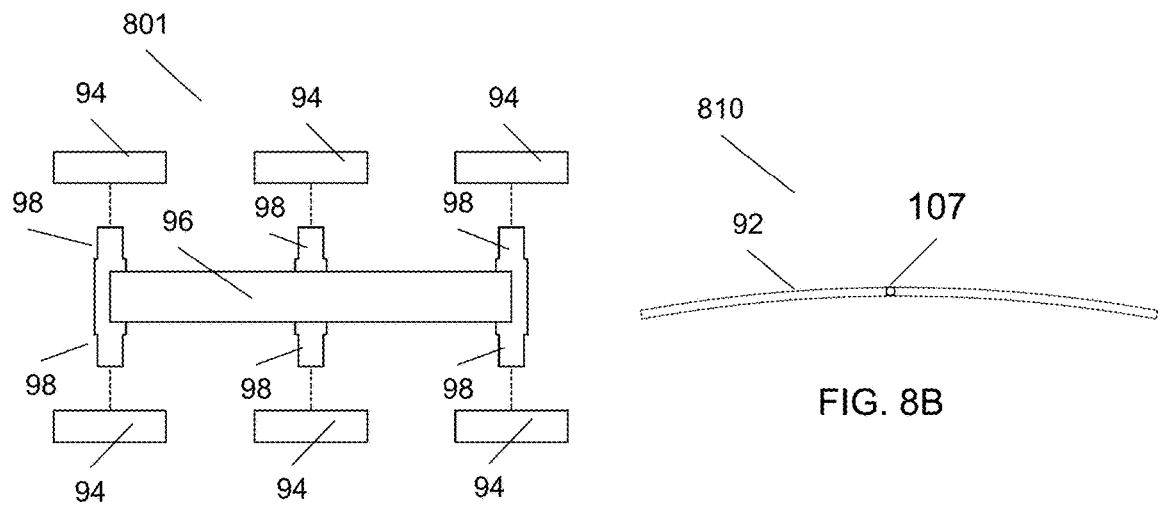
FIG. 8A
FIG. 8B
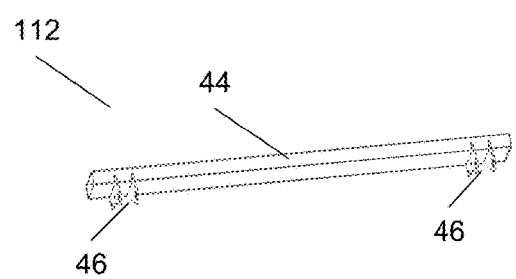
FIG. 9
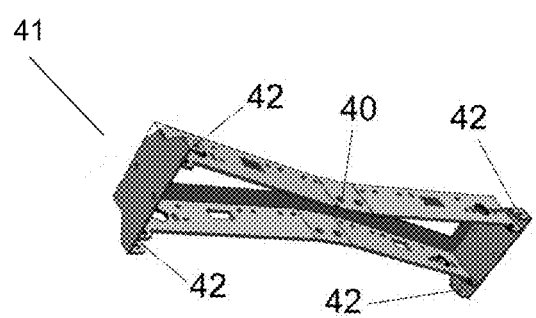
FIG. 10

SYSTEMS FOR VEHICLE LOAD MANAGEMENT

CROSS REFERENCE TO RELATED APPLICATIONS

The present application claims the filing benefits of U.S. provisional application Ser. No. 62/416,118 filed Nov. 1, 2016, which is hereby incorporated herein by reference in its entirety.

TECHNICAL FIELD

This invention generally relates to load management systems for unloading and onloading trailers or hauling platforms. More specifically, the present invention includes systemized controls, apparatus, and mechanisms for unloading ("offloading") or loading ("onloading") portable buildings or equipment with respect to a trailer or an open, flat hauling platform.

BACKGROUND OF THE INVENTION

Many companies have been making sheds and portable outdoor buildings for decades and selling to the public, typically buyers for placement in either rural or suburban settings. A portable outdoor building may be embodied and used as a storage shed, garden shed, garage, playhouse, or gazebo.

The term "shed" is used throughout herein to be equivalent with any of the aforementioned embodiments of portable buildings and other similar embodiments that could benefit from having an offloading and onloading system that increases the ease, safety, minimal damage, and time associated with offloading or onloading a portable shed.

To initially load a shed onto an exemplary open bed trailer or to remove a shed first requires a loading or "onloading" operation or procedure which may be met with many potential challenges from terrain and environmental conditions.

After the acquired shed has loaded or "onloaded," it is delivered to a customer site for unloading or "offloading" and installation. Once the shed has arrived at a customer site, offloading from the exemplary open bed trailer also offers many potential challenges from terrain and environment.

An onloading and offloading ("load management") system may also be useful for other embodiments somewhat dissimilar to portable buildings including for example, a piece of industrial equipment or skid.

Hereinafter, the use of the term "load management system" is synonymous and equivalent to "loading/unloading", "onloading/offloading", "loading and unloading", and "onloading and offloading" system, device, apparatus, mechanisms, and machine contexts and associated functional terminologies.

An offloading or unloading site is frequently in rugged terrain or in a backyard setting, neither of which are likely to have a drive way, lane, street, highway, path, or road leading to the exact spot for unloading. In many cases the shed or equipment deliverable is best unloaded transversely relative to the longitudinal direction and orientation of the trailer. Also, in many cases, the shed or equipment must be offloaded at a significant distance from the trailer's closest accessible location using normal vehicular means. The pathway from the closest accessible location using normal vehicular means to the final resting placement or offloading site is many times over "hostile terrain" that may be any combination of slick, muddy, soft, wet, rugged, rocky, cragged, uneven, unlevel, jagged, irregular, rough, and steep.

The hostile terrain issues can be a factor in both onloading and offloading circumstances and locations with regard to safe, reliable, and efficient operations. For example, there may be a need to repossess the exemplary shed for lack of payment.

Effective onloading or offloading with ease, safety, minimal damage, and efficient management of time can be provided by a well-designed load management system incorporated into or mounted onto the hauling vehicle; for example the load management system may be preferably mounted on the bottom side of an open bed trailer. The operation of an effective load management system incorporated into a trailer or hauling platform may be performed by an operator by simply pressing buttons and switches that control the load management system operations.

An exemplary shed load management system is best located underneath and mechanically attached to the frame of the shed trailer. The exemplary load management system for a shed is sized and mounted to the underbelly of the shed trailer in such a way that it does not normally interfere with the motion of the trailer during hauling and transport followed by pre-positioning of the shed to the final setup destination. During such a transport, the load management system remains (preferably locked) in a retracted low profile position under the trailer in order to minimize the effective size and maximize road clearance, otherwise the load management system is subject to damage incurred by striking an object or raised section of the drive way, lane, street, highway, path, or road leading to the exact spot for unloading.

For a shed load management system to be effective, it must have several mechanical actions and functions available for activation by a system operator. There must be an operator interface (switch box/control unit) for the operator to use to activate and preferably to monitor the progress and status various load management system actions and states.

For a load management system to be most effective and useful it must be able to extend downward (engage) and lift the entire weight of the loaded trailer upward by pressing the assembly (preferably through mobilizing tracks) against the ground until the trailer wheels no longer are in contact with the ground.

Once an exemplary shed trailer is lifted by the offloading system tracks, the load management system establishes motion control capability of the shed trailer. Once the load management system as achieved motion control capability, it can be operated to move the shed trailer transversely along with several other movement actions and degrees of freedom such as load levelling, tilting, and setting an optimal offload orientation of the exemplary shed trailer.

The load management system preferably includes several mechanical members to affect the aforementioned motion control and associated movements that directly control the exemplary shed trailer movements.

Historically unloading or offloading systems have used wheels with tires to attempt lift and motion control and other associated movements. However, wheel/tire based systems are problematic and result in increased difficulties and challenges to both onloading and offloading operations. Increased difficulties and challenges include increased onloading and offloading time, inability to unload at the desired spot, damage to the shed during onloading or offloading, and inability to maneuver and move the trailer transversely due to hostile terrain. Wheel/tire based loading or unloading systems are inherently unstable with inferior traction as compared to a continuous track based load management system. The loading or unloading site is often hostile terrain and may be wet, muddy, soft, or irregular causing the wheel/tire based loading or unloading system controlling the trailer to bog down, get stuck, or slide uncontrollably in a wrong direction.

Loading and unloading systems using wheels/tires are subject to tire damage including deflation or destruction of tires during a loading or unloading circumstance. What has been needed is a load management system with powered continuous tracks for durability as well as for traction in hostile terrain and load stability.

Due to the issues, difficulties, and challenges ("problems") described herein and others there has been a long felt need for a shed trailer onloading/offloading system that is capable of overcoming and resolving these problems.

BRIEF DESCRIPTION OF THE INVENTION

Some or all of the above insights, needs, problems, and limitations may be addressed by at least the summary of various aspects of the invention as described as follows:

The invention is useful, effective, and beneficial for load management including onloading and offloading of a plurality of load types on land applications particularly when a load is large, bulky, or top heavy.

Furthermore the invention can be used for load management including onloading or offloading load sheds or other bulky loads including equipment such as machinery by lifting and moving the hauling vehicle or trailer transversely in either side direction rather than the rear direction of an elongated hauling vehicle or trailer body.

In one aspect of the invention, the low profile continuous tracks facilitate a lower overall disengaged profile of the load management system when disengaged or non-extended. The disengaged or non-extended load management system increases the ground clearance when the trailer is being used for hauling and transport and pre-positioning of the shed to the offloading and final setup destination.

In another aspect of the invention, the load management system remains positively locked in retracted or disengaged position with a series of one or more locking pins locked in position or engaged during storage, hauling, transport, or pre-positioning for offloading and during all times and circumstances other than offloading or onloading operations.

In another aspect of the invention, powered low profile continuous tracks are used for superior traction (relative to wheels with pressurized or solid rubber tires) in hostile terrain when the load management system is engaged or extended making contact with the ground.

BRIEF DESCRIPTION OF THE DRAWINGS

The foregoing, and other aspects, and embodiments will be better understood from the following detailed description of the exemplary embodiments of the invention with reference to the drawings, in which:

FIG. 1A is a block diagram of the controls, hydraulics, and mechanicals of the load management system.

FIG. 1B is an embodiment of a portable human machine interface and wireless transmitter.

FIG. 8a is a top view of three sets of dual roller pairs on a side roller assembly as used in the roller assembly.

FIG. 8b is a side view of a bow spring with an unloaded radius used in the roller assembly to connect two or more side roller assemblies together.

FIG. 9 is a perspective view of a fixed lower linkage mount frame.

FIG. 10 is a perspective view of a fixed upper linkage mount frame.

DETAILED DESCRIPTION

Figure 2A:
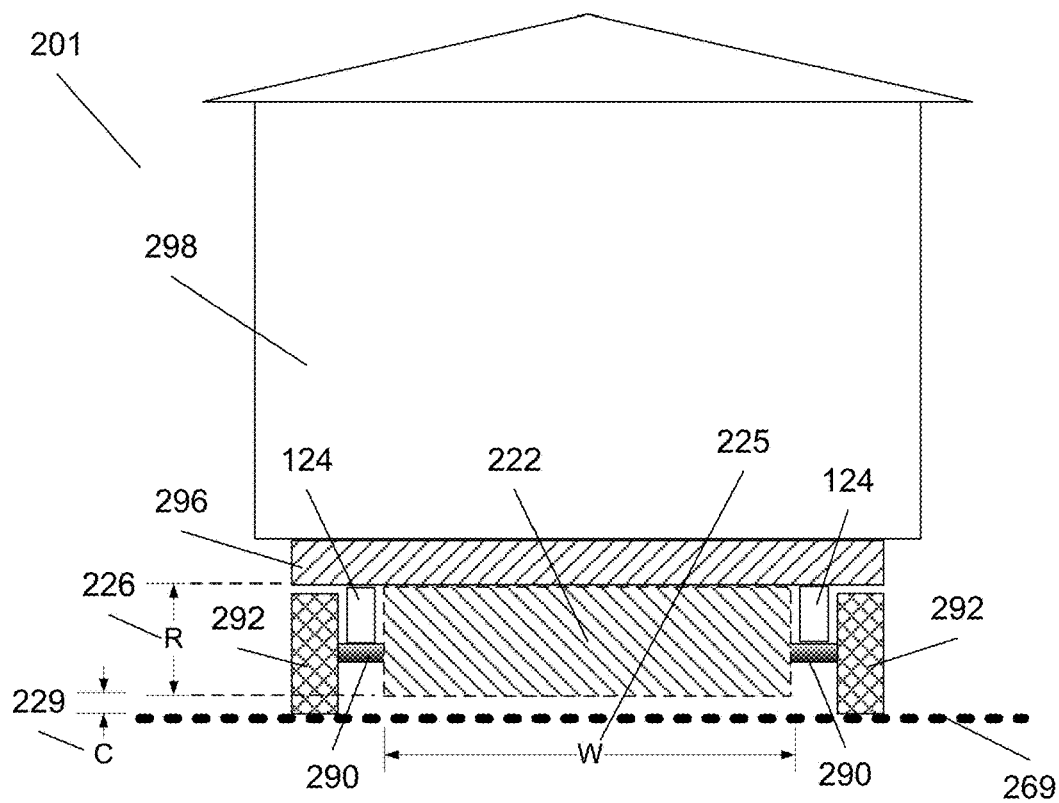
FIG. 2A is a sectioned diagram of a trailer loaded with an exemplary shed showing the location of a disengaged load management system retracted for hauling.

Example embodiments of the invention now will be described more fully hereinafter with reference to the accompanying and incorporated by reference (cross-referenced) drawings, in which embodiments of the invention are shown. This invention may, however, be embodied in many different step sequences, forms, structures, or materials and should not be construed as limited to the embodiments set forth herein. Rather, these embodiments are provided so that this disclosure will be thorough and complete, and will fully convey the scope of the invention to those skilled in the art.

Like identified numbers refer to like elements throughout. The use of asterisks herein is indicative of multiplication operations unless otherwise noted.

It should be noted that, as used in the specification and the appended claims, the singular forms "a" and "the" include plural referents, unless the context clearly dictates otherwise. The use of the term, "slot" herein applies to any cutout or opening that is non-circular and generally has an elongated opening that is greater in length than the transverse width of the opening.

With reference to FIG. 1A, block diagram of an exemplary load management control system 149 shown includes communication, controls, hydraulics, and load management mechanical control of the load management system 122 wherein associated mechanicals and hydraulics are shown in other FIGs. An optional portable wireless control unit 150 provides operator and human machine interface functionality for the control of various operations of the load management system 122. The portable wireless control unit 150 is linked to a wireless receiver unit 152 using radio signals 151 with frequencies and protocols including, but not limited to, IEEE 802 standards; Wi-Fi, Bluetooth, or Zigbee.

With continuing reference to FIG. 1A, the wireless receiver unit 152 receives and converts RF signals into control states suitable for controlling the various operations of the load management system 122. In summary, the exemplary load management control system 149 includes:
a) a communication 151 from the wireless control unit 150 to a wireless receiver unit for conversion to wired electrical signals,
b) a local control unit 154 receiving wired electrical signals and local switch signals for controlling a hydraulic system 156,
c) a load management mechanical system 158 controlled by the hydraulic system 156 and other mechanical settings.

The control states are electrical signals, for example, communicated by relays or solid state devices through wires or cables interconnecting the wireless receiver unit 152 and the local control unit 154.

Figure 13:
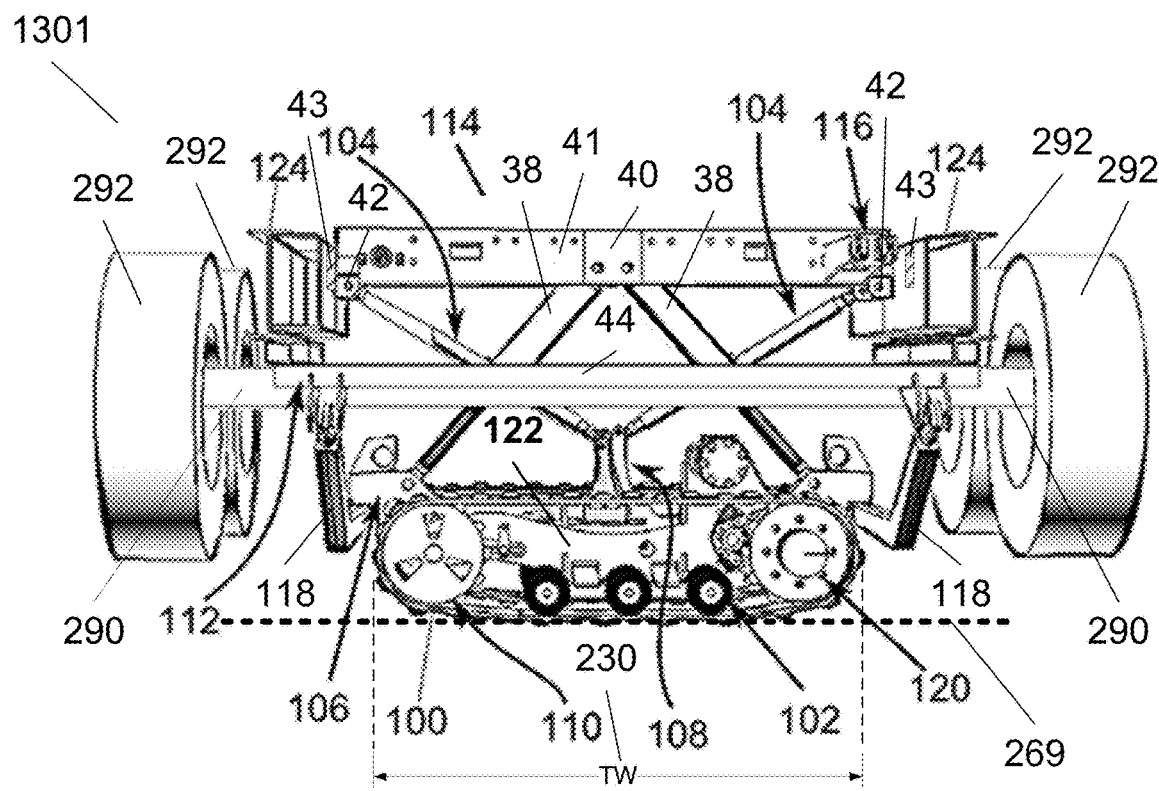
FIG. 13 is a perspective view of a load management system extended and lifting a trailer (partial view of trailer shown).

With continuing reference to FIG. 1A, a local control unit 154 communicates wireless to wired (converted) electrical signals and control states from the wireless receiver unit 152 or alternatively based on switch settings from the local control unit 154 communicates (wired) power to and in control of various hydraulic and mechanical operations of the load management system 122. The control states or signals from the wireless receiver unit 152 may be enabled or controlled locally using local switches of the local control unit 154 to the hydraulic system 156 listed as follows:

POWER Switch: REMOTE/OFF/SWITCHES selections or positions for one of 3 possible control modes. The Power Switch off control mode is in the center off position. Local control switches are bypassed when the Power Switch is in the REMOTE position whereby the control states from wireless receiver unit 152 are passed along in remote control mode to the hydraulics 156. The Power Switch can be in "Switches" control mode by holding the switch down in the SWITCHES position while simultaneously activating any of the local control switches as follows:

TRACKS Switch: UP/DOWN selections or positions for either up or down motion of the load management system 122 with tracks 100 contacting the ground based on hydraulic pressure in the lifting cylinders 38 as seen in FIG. 13.

LEVEL Switch: LEFT/RIGHT selections or positions for load leveling by the load management system 122 for either left or right end of tracks 100 as viewed from the rear as in FIG. 13 in primary contact with the ground to level the load based on the ground or terrain slope 269.

DRIVE Switch: LEFT/RIGHT selections or positions for load drive motion by the load management system 122 for either left or right directional motion as viewed from the rear as shown in FIG. 13.

With continuing reference to FIG. 1A, the hydraulic system 156 provides hydraulic power to hydraulic cylinders and motor(s) of the load management mechanical system 158, thus controlling the lifting and driving motions and movements of the load management system 122.

With reference to FIG. 1B, an exemplary embodiment of a portable human machine interface and wireless control unit 150 or "remote control device" is shown including switches and indicators as follows ("PB" stands for "pushbutton" and "LED" stands for "light emitting diode"):
POWER ON PB 126: powers up the wireless control unit 150, also changes switches to an alternate actions when pressed with the power already on.
POWER OFF PB 127: powers down the wireless control unit 150
UP PB 130: remotely and wirelessly activates up/retracted action in load management system 122
DOWN PB 131: remotely and wirelessly activates down/extended action in load management system 122
LEVEL LEFT PB 132: remotely and wirelessly activates left side lift action for load leveling in load management system 122
LEVEL RIGHT PB 133: remotely and wirelessly activates right side lift action for load leveling in load management system 122
DRIVE LEFT PB 134: remotely and wirelessly activates left moving motion in load management system 122
DRIVE RIGHT PB 135: remotely and wirelessly activates right moving motion in load management system 122
Bat Low LED indicator 128
ACTIVE LED indicator 129

With reference to FIG. 2A, a sectioned diagram 201 of a trailer is shown loaded with an exemplary shed 298 loaded on the trailer flatbed 296 with a disengaged load management system section 222 retracted and locked (locking pin 30 not shown in FIG. 2A but can be seen in FIG. 16 in locked position) for hauling or staging. The trailer sections shown include from top to bottom; a hauling trailer flatbed 296, a hauling trailer frame section 124, an exemplary axle 290, and wheel/tires 292.

With continued reference to FIG. 2A, in the retracted configuration, as measured by retracted load management system height R 226, the load management system 222 (shown sectioned) provides road and terrain clearance C 229 relative to the ground or terrain surface line 269. The overall width W 225 of the load management system 222 is approximately 55.5 inches (1.41 m) for typical shed trailer applications. However, the overall width W 225 will increase proportionally for applications involving larger semi-trailers, pulled by rigs, typically having 18 wheels. The overall width W 225 is wider than the continuous tracks 100 width TW 230 shown in FIG. 13 due to the locations of lower link assemblies 118 (shown in FIG. 13) extending wider than the continuous tracks 100 width TW 230. The retracted height R 226 of the disengaged load management system section 222 is approximately 18.5 inches (0.47 m) for typical shed trailer 298 applications. The clearance C 229 relative to the ground or terrain surface line 269 depends upon factors such as wheel/tire 292 radius including pressurization and load weight conditions.

Figure 2B:
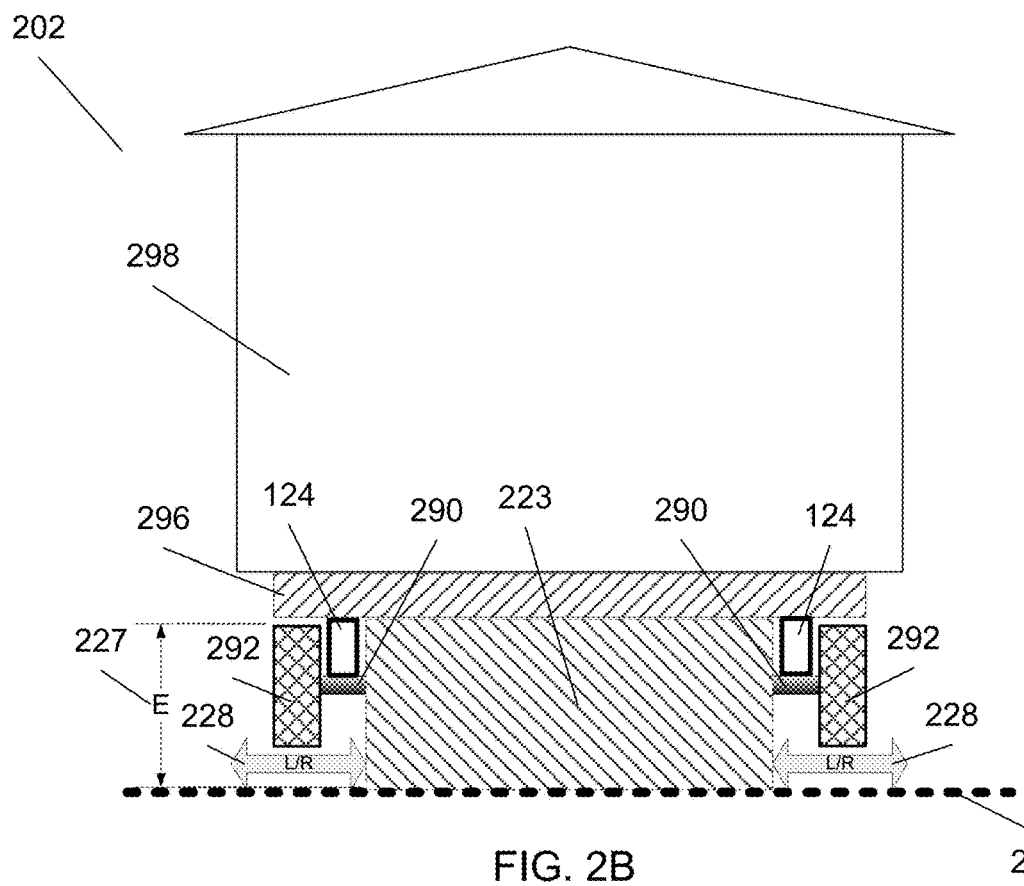
FIG. 2B is a sectioned diagram of a trailer loaded with an exemplary shed showing the location of an engaged load management system extended for offloading or onloading operations.

With reference to FIG. 2B, a sectioned diagram 202 of a trailer is shown loaded with an exemplary shed 298 loaded on the trailer flatbed 296 with an engaged load management system configuration section 223 extended for onloading or offloading operations. The trailer sections shown include from top to bottom; a trailer flatbed 296, a trailer frame section 124, an exemplary axle 290, and wheel/tires 292. In the extended configuration, the load management system section 223 provides lift for the trailer and any loads including a shed 298 (including any other loads including no load) relative to the ground or terrain surface line 269. The extended height E 227 of the engaged or extended load management system section 223 is approximately 40.0 inches (1.02 m) for typical shed trailer applications. A maximum load management system 223 extended configuration of 21.5 inches (055 m) is archetypal for typical shed trailer applications.

The lifting capacity of the extended load management system 223 is approximately 20,000 pounds (9072 kg) for typical shed trailer applications but is scalable as needed by changing the lift cylinders 38 and associated mounts and under-carriage frame assembly 106 (as shown in FIG. 13) and other mechanical components proportionally. As shown in FIG. 2B; a lifted trailer (with or without a load) can be moved transversely left or right as indicated by arrows 228 as viewed from the rear of the trailer by the load management system 223. As shown in FIG. 4B, the movement 228 is driven by continuous tracks 100 powered by the torque supply device 56 for driving continuous tracks 100. As shown on FIG. 13; the power from the torque supply device 56 for driving continuous tracks 100 is transmitted as torque through exemplary axles, chains, and sprockets of FIG. 4B to the continuous tracks 100 which is in contact with the ground and converted to transverse linear force and motion over the ground overcoming friction and terrain variations.

Figure 3A:
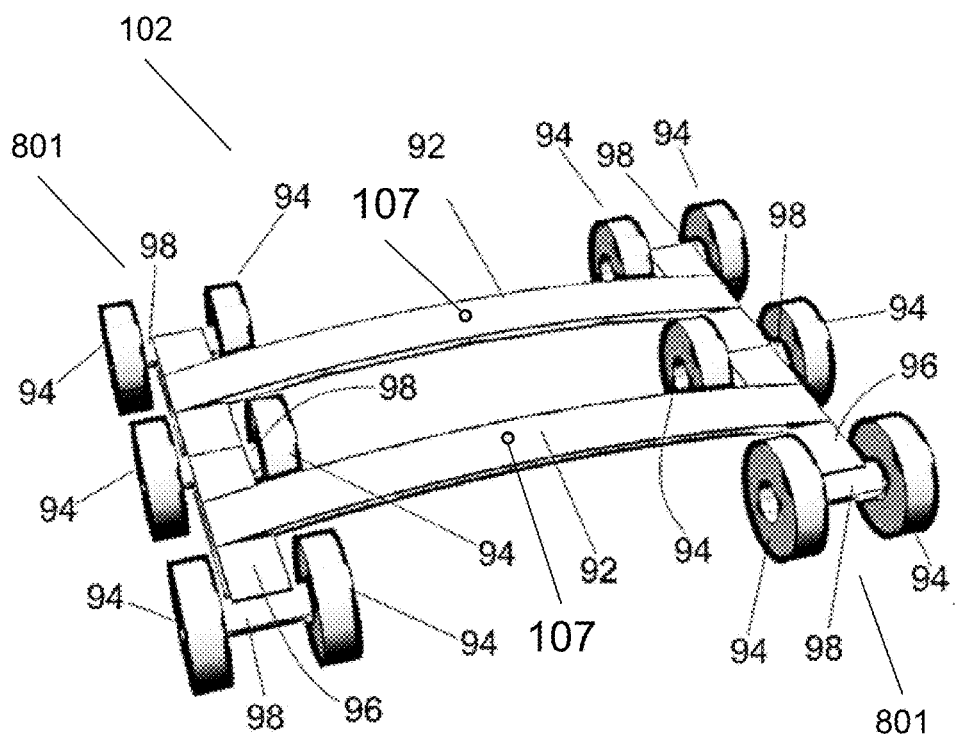
FIG. 3A is a perspective view of a roller assembly used in conjunction with a set of continuous tracks.

Starting with FIG. 3A, various assemblies, sub-assemblies, and mechanical members or sections of invention are illustrated. However, FIGS. 16 through 21 are illustrations of various configurations and orientations of essentially fully assembled exemplary and preferred embodiments of the load management system.

With reference to FIG. 3A, an exemplary roller assembly 102 is shown including a series of 6 dual rollers 94 with 3 dual roller pairs on each side roller assembly 801 (left and right sides as viewed in FIG. 3A) of exemplary roller assembly 102. The dual roller pairs with 2 roller wheels 94 each is mounted on a roller mount or roller axle with hub 98 which is fixated and distributed evenly or approximately with equal parallel axle separation on a mounting body 96 with the roller wheels separated by the roller mounting body 96 as a side roller assembly 801. Each roller mount or roller axle with hub 98 is fixated on a roller mounting body 96 by any combination of welds, spot welds, threaded bolts with nuts, rivets, or any other effective fastening means. Although 3 dual roller pairs on each side (left and right sides as viewed in FIG. 3A) are shown, there may be more or less than 3 dual roller pairs 94 per side attached to the mounting body 96 depending on the load weight to be supported and size of the non-extended and unloaded load management system section 222 of FIG. 2A as well as the extended and loaded load management system configuration section 223 of FIG. 2B.

With continuing reference to FIG. 3A, there are 2 partial roller assemblies connected by a series of at least two (2) parallel aligned roller bow springs 92 to complete the exemplary roller assembly 102. The series of at least two (2) parallel aligned roller bow springs 92 are attached orthogonally to roller mounting bodies 96 either before or after the roller pairs are mounted to the roller mounting bodies 96. The at least 2 roller bow springs 92 are attached orthogonally to roller mounting bodies 96 by any combination of welds, spot welds, threaded bolts with nuts, rivets, or any other effective fastening means.

Figure 14:
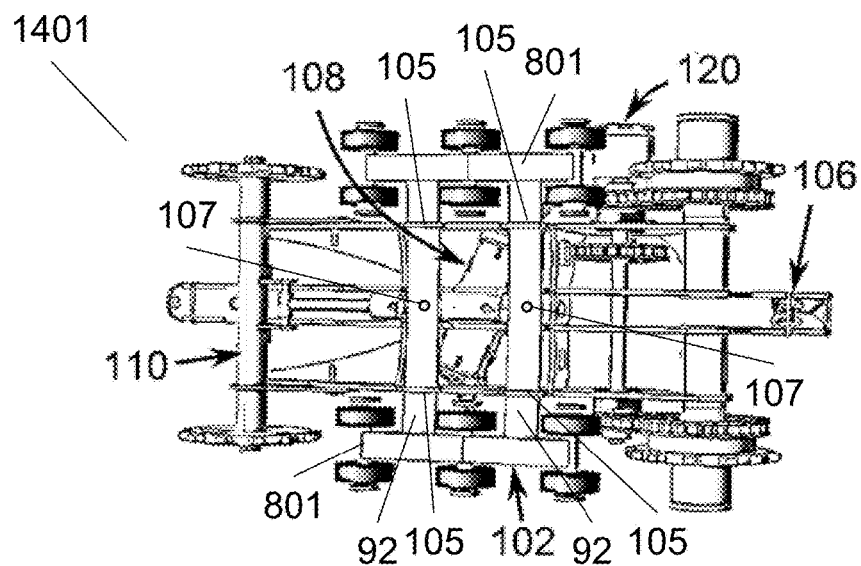
FIG. 14 is a bottom perspective view of a partial assembly of the load management system is shown including the roller assembly, the under-carriage frame assembly, the swiveling link assembly, the idler axle assembly, and the drive assembly under-carriage.

With continuing reference to FIG. 3A, the at least two (2) roller bow springs 92 each include a preferably central (located approximately midpoint lengthwise and widthwise) bow spring mounting hole 107 for mounting the roller assembly 102 to under-carriage frame assembly 106, (the combination shown in FIG. 14). The at least two (2) roller bow springs 92 are attached to the under-carriage frame assembly 106 at spring mounting hole 107 locations by any combination of welds, spot welds, threaded bolts with nuts, rivets, or any other effective fastening means. The at least two (2) roller bow springs 92 are further secured by the under-carriage frame assembly 106 at bow spring frame slots 105. Two exemplary near side bow spring frame slots 105 of the under-carriage frame assembly 106 are shown in FIG. 3B.

Figure 3B:
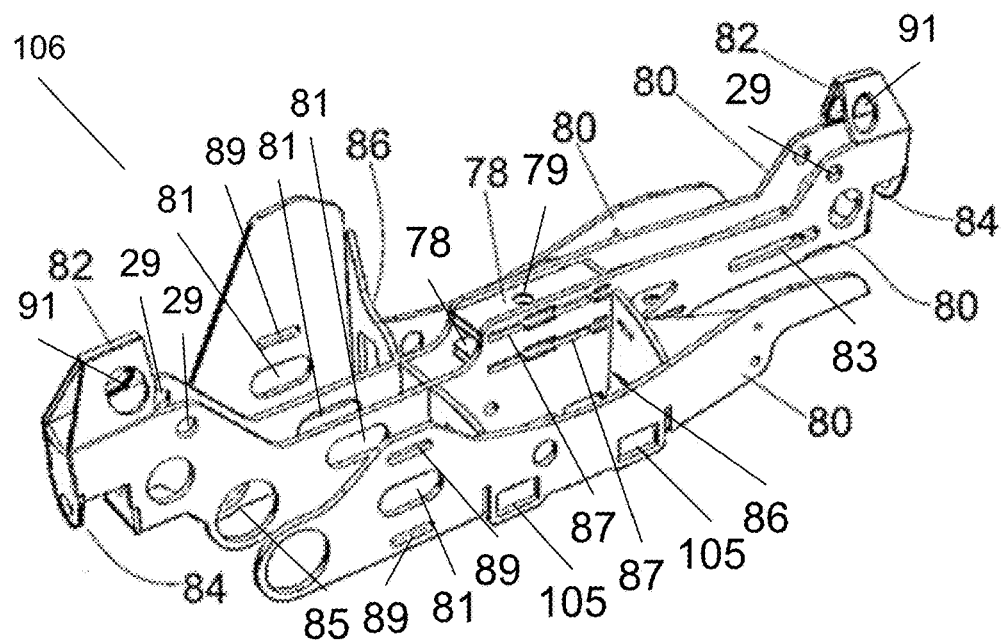
FIG. 3B is a perspective view of an under-carriage body or frame.
Figure 7:
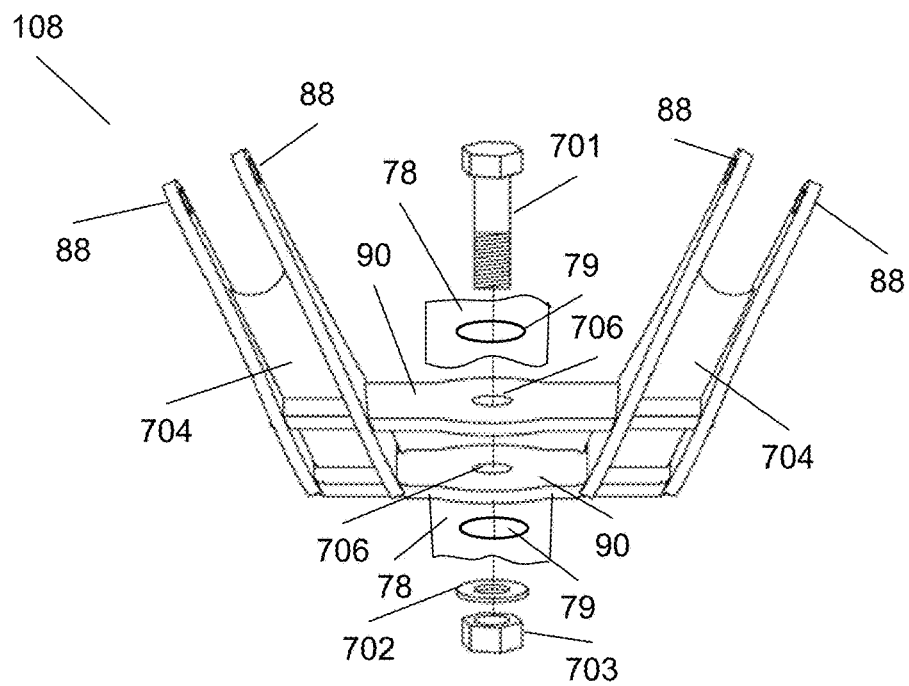
FIG. 7 is a perspective view of a swiveling linkage mount body including fasteners.

With reference to FIG. 3B, an embodiment of an under-carriage frame assembly 106 is shown. A series of under-carriage elongated frame main members 80 attached to a series of under-carriage transverse cross members 86 and an under-carriage frame swivel frame pivot mount 78 including an upper and a lower plate transversely attached to the carriage main members 80 as shown. Pivot frame mounting holes 79 (lower plate pivot mounting hole not shown) are centrally located in both the upper and lower plates of the under-carriage frame swivel frame pivot mount 78 for mounting a swiveling link assembly 108 as shown in FIG. 7. The upper and lower plates of the swiveling frame pivot frame 90 (see FIG. 7) extend outwardly through swiveling frame slots 87 which limit the range of rotational motion of the swiveling link assembly 108.

With continuing reference to FIG. 3B, a series of at least two under-carriage frame locking tabs 82 attach to the inner two under-carriage frame main members as shown. The locking tabs 82 on opposing ends of the elongated frame main members have locking pin transverse holes 91 used to accept locking pins 30 as shown engaged in the locked position in FIG. 16 and shown disengaged in the unlocked position in FIG. 17.

With continuing reference to FIG. 3B, a series of mounting, a series of at least two under-carriage frame lower link mounts 84 attach to the under-carriage frame main members 80 as shown for mounting the lower link assemblies 118. A series of at least two sets of under-carriage frame lift mount holes 29 for mounting devices 38 for lifting, (preferably hydraulic cylinders).

Figure 11:
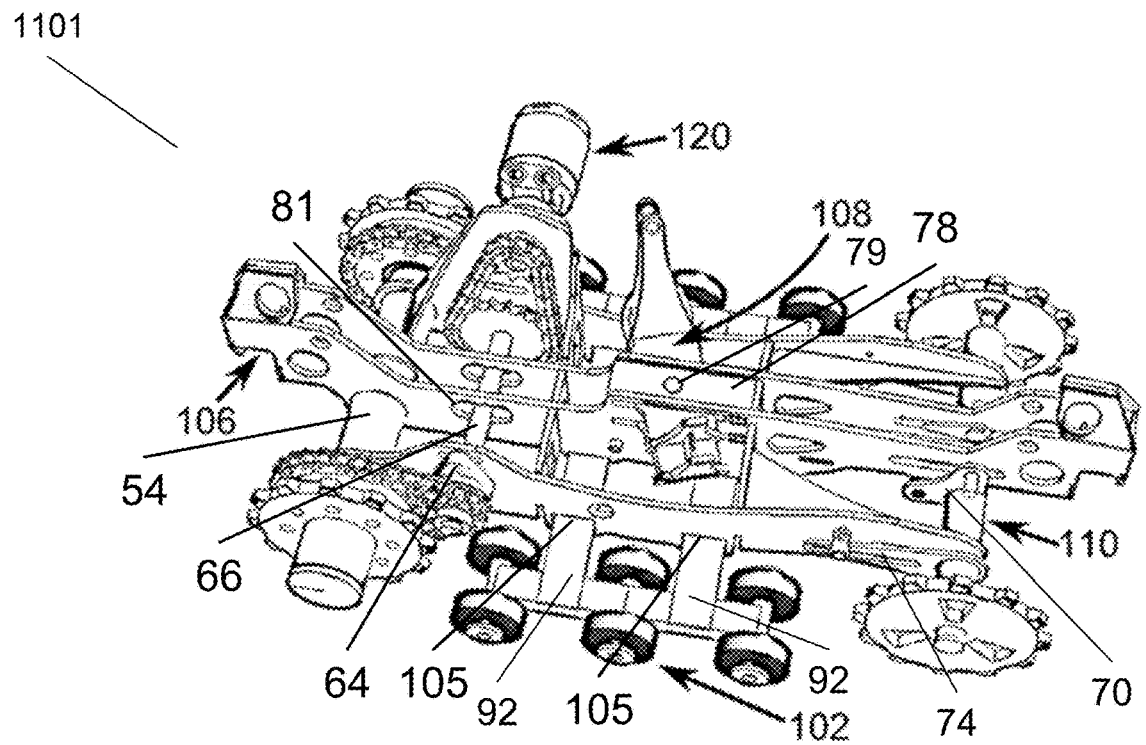
FIG. 11 is a perspective rear view of a partial assembly of the load management system including the roller assembly, the under-carriage frame assembly, a swiveling link assembly, and an idler axle assembly fitted together. under-carriage.

With continuing reference to FIG. 3B, a series of clearance or jack shaft passageway slots 81 are included for the jack shaft 66 passage through the under-carriage frame main members 80 as further shown in FIG. 11.

With continuing reference to FIG. 3B, a series of idler axle mounting slots 83 are included for attaching a series of inner brackets to mount idler axle 70 as further shown in FIG. 11.

With continuing reference to FIG. 3B, a series of jack shaft bearing mounting slots 89 in sets of two each for mounting jack shaft bearings 64 to the under-carriage frame main members 80 are included as further shown in FIG. 11.

With continuing reference to FIG. 3B, a series of jack shaft passageway slots 81, for passage of a jack shaft 66 through the under-carriage frame main members 80, are included as further shown in FIG. 11.

With continuing reference to FIG. 3B, a series of drive axle mounting holes 85 for mounting a drive axle with hub 54 through the under-carriage frame main members 80, are included as further shown in FIG. 11.

Figure 4A:
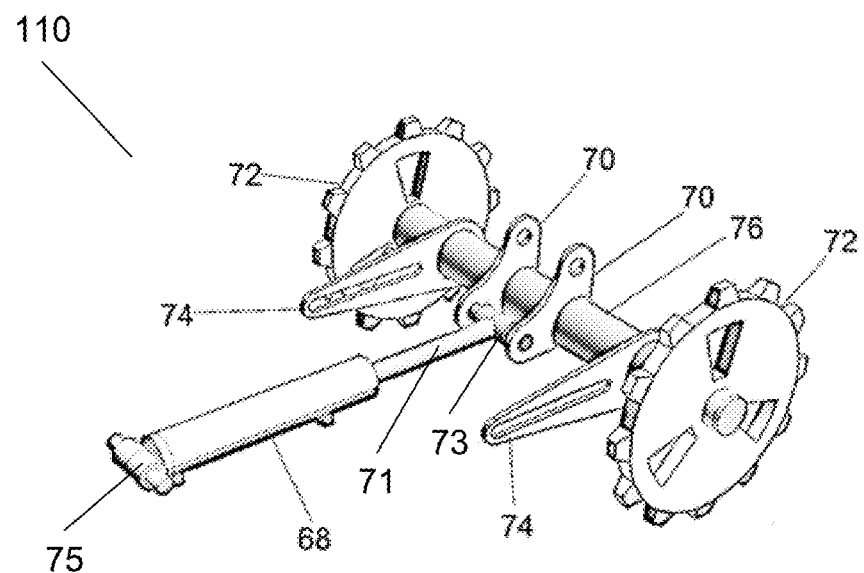
FIG. 4A is a perspective view of an idler axle assembly for tensioning the continuous tracks.
Figure 4B:
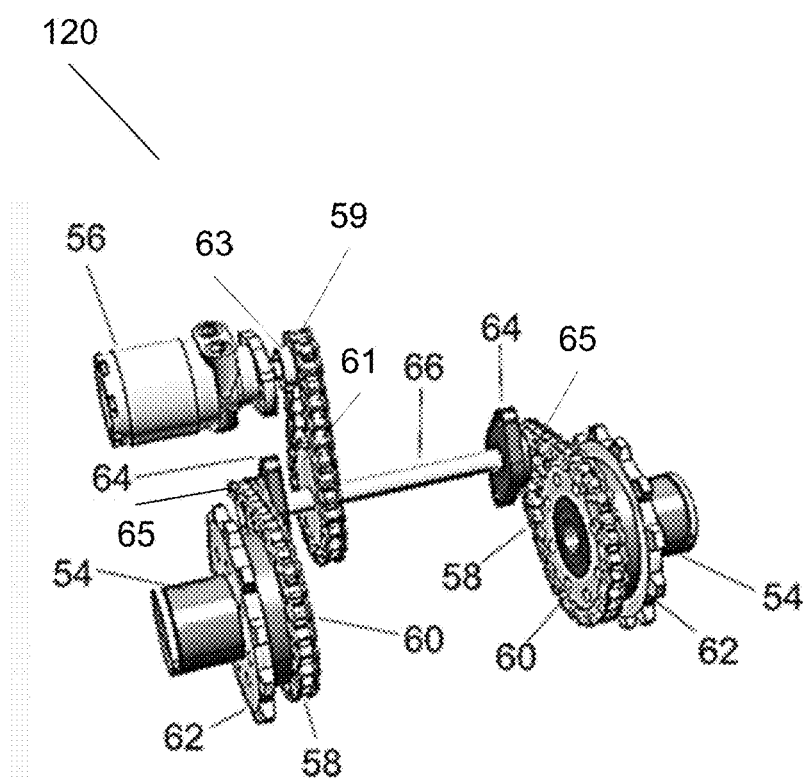
FIG. 4B is a perspective view of a continuous track drive mechanism.

With reference to FIG. 4A, an embodiment of an idler axle assembly 110 is shown. The idler axle assembly 110 includes a tensioning device 68 for tightening or loosening a set of continuous tracks 100 mounted between idler sprockets 72 of idler axle assembly 110 and continuous drive sprockets 62 of drive assembly 120 as partially shown in FIGS. 13, 16, and 17. The tension of the continuous tracks 100 is controlled by tensioning device 68 communicating force to continuous track idler sprockets 72 while the outer brackets to mount idler axle 74 are loose and unattached to the under-carriage frame assembly 106 (shown in FIGS. 11 and 13). Once the proper tension of the continuous tracks 100 between idler sprockets 72 of idler axle assembly 110 and continuous drive sprockets 62 of drive assembly 120 is established by adjusting the force delivered by the tensioning device 68, the outer brackets to mount idler axle 74 are secured to maintain the tension by any combination of welds, spot welds, threaded bolts with nuts, rivets, or any other effective fastening means at a provided slot in each bracket.

With continuing reference to FIG. 4A and FIGS. 11 and 13, the continuous tracks 100 interconnecting idler sprockets 72 of idler axle assembly 110 and continuous drive sprockets 62 of drive assembly 120 are preferably tightened by a cylinder adjustably filled with grease as a tensioning device 68. The continuous tracks 100 can also be tensioned using a hydraulic cylinder, springs, one or more motorized or non-motorized (manually adjusted) lead screws, or an electric actuator such as a precision linear actuator. The idler tensioning rod 71 includes an idler to frame coupling hub 75 with axle that rotatively attaches to the under-carriage frame assembly for securing the idler axle assembly 110. The idler tensioning rod 71 includes an idler tensioning coupling hub 73 with axle rod that rotatively attaches to inner brackets 70 which are attached to or mounted on idler axle with hub 76. The idler tensioning rod 71 communicates force from the tensioning device 68 through an idler tensioning coupling hub 73 with axle rotatively attached to an inner bracket 70 attached to an idler axle with hub 76.

With continuing reference to FIG. 4A, a set of at least two outer idler brackets 74 for mounting the idler axle assembly 110 is attached to idler axle hub 76. A set of at least two (2) continuous track idler sprockets 72 attach to the idler axle with hub 76 as shown in FIG. 4A. This embodiment as shown in FIG. 4A has an exemplary second continuous track idler sprocket 72, but can have any additional number of idler sprockets as a set for tensioning multiple continuous tracks 100 as shown mounted on idler sprockets 72 of in FIGS. 13, 16, and 17.

With reference to FIG. 4B, an exemplary drive assembly 120 is shown. A primary drive chain sprocket 63 attaches to a torque supply device 56 (preferably a hydraulic motor) for driving continuous tracks 100 further identified in FIG. 13 wherein the continuous tracks 100 are shown mounted on and interconnecting with both the exemplary drive assembly 120 and the idler axle assembly 110. A primary chain 59 in FIG. 4B communicates torque from the primary drive chain sprocket 63 to the primary jack shaft sprocket 61 mounted to jack shaft 66.

With continued reference to FIG. 4B, the mounting location of jack shaft 66 relative to the primary drive chain sprocket 63 is such that a suitable amount of tension is maintained in the primary chain 59 to secure the primary chain 59 between the primary chain sprocket 63 and the primary jack shaft sprocket 61. The term, suitable, with regard tension herein generally applies to a tension range whereby the chain will not be able to fall, fly, or slip off either of its associated sprockets. Terms like sag or droop as distance offline of a fully tightened chain can be used to quantify a suitable chain tension.

With continued reference to FIG. 4B, during non-activation of the torque supply device 56, a suitable amount of tension is realized when the pulling (torque communicating) side or return (slack) side of the primary chain 59 has no more than a 10% droop or sag (whereby % sag is the distance the chain sags due to gravity divided by the chain length not in contact with a sprocket in percent units) relative to the non-radial chain section length not in contact with primary sprockets (61 and 63) based on separation of the primary sprockets (61 and 63) on either side of the primary chain 59 while not communicating torque.

With continued reference to FIG. 4B, during activation of the torque supply device 56, a suitable amount of tension is realized when the pulling (torque communicating) side of the primary chain 59 has no more than a 5% droop or sag relative to the non-radial chain section length not in contact with primary sprockets (61 and 63) based on separation of the primary sprockets (61 and 63).

With continued reference to FIG. 4B, during activation of the torque supply device 56, a suitable amount of tension is realized when the return (slack) side of the primary chain 59 has no more than a 15% droop or sag relative to the non-radial chain section length not in contact with primary sprockets (61 and 63) based on separation of the primary sprockets (61 and 63).

With continued reference to FIG. 4B, while maintaining a suitable tension in the primary chain 59, the mounting location of jack shaft 66 is furthermore relative to the roller chain sprocket 60 such that a suitable amount of tension is maintained in a series of 2 or more roller chains 58 to secure the roller chains 58 between the roller chain sprockets 60 and the jack shaft roller sprockets 65.

With continued reference to FIG. 4B, during non-activation of the torque supply device 56, a suitable amount of tension is realized when the pulling (torque communicating) side or return (slack) side of each roller chain 58 has no more than a 10% droop or sag relative to the non-radial chain section length not in contact with sprockets (60 and 65) based on separation of the sprockets (60 and 65) on either side of each roller chain 58 while not communicating torque.

With continued reference to FIG. 4B, during activation of the torque supply device 56, a suitable amount of tension is realized when the pulling (torque communicating) side of each roller chain 58 has no more than a 5% droop or sag relative to the non-radial chain section length not in contact with sprockets (60 and 65) based on separation of the sprockets (60 and 65).

With continued reference to FIG. 4B, during activation of the torque supply device 56, a suitable amount of tension is realized when the return (slack) side of each roller chain 58 has no more than a 15% droop or sag relative to the non-radial chain section length not in contact with sprockets (60 and 65) based on separation of the sprockets (60 and 65).

With continued reference to FIG. 4B, torque is generated and communicated from a torque supply device 56 (preferably a hydraulic motor). A primary roller chain 59 communicates torque from the primary roller chain sprocket 63 to the jack shaft sprocket 61. The jack shaft sprocket 61 further communicates the torque to the jack shaft 66 by means of being attached to or mounted on the jack shaft 66. The jack shaft 66 dividedly distributes and respectively communicates torque through a series of at least two (2) jack shaft sprockets 65 to respective roller chains 58. The series of at least two (2) roller chains 58 respectively communicate the divided torque to each roller chain sprocket 60 as a subdivision of a respective series of at least two (2) roller chain sprockets 60. The roller chain sprockets 60 respectively communicates the divided torque to each of a series of at least two (2) continuous track drive sprockets 62 by means of being attached to continuous track drive sprockets 62. The series of at least two (2) continuous track drive sprockets 62 are shown with each sprocket of 62 attached to a drive axle with hub 54 (the extended drive axle with hub 54 between the roller chain sprockets 60 is not shown in FIG. 4B but can be seen in FIG. 12). The at least two (2) continuous track drive sprockets 62 respectively communicates the divided torque to at least two (2) continuous tracks 100 as shown in FIG. 13. The series of at least two continuous tracks 100 respectively convert the divided torque from the at least two continuous track drive sprockets 62 to linear motion of the load management system 122 with at the least one of the continuous tracks 100 in contact with the ground 269 or at a ground or terrain contact point. Only one of the two continuous tracks 100 will remain in contact with the ground during load leveling operations whereas both of the two continuous tracks 100 will remain in contact with the ground during linear transverse motion on level terrain.

Figure 5:
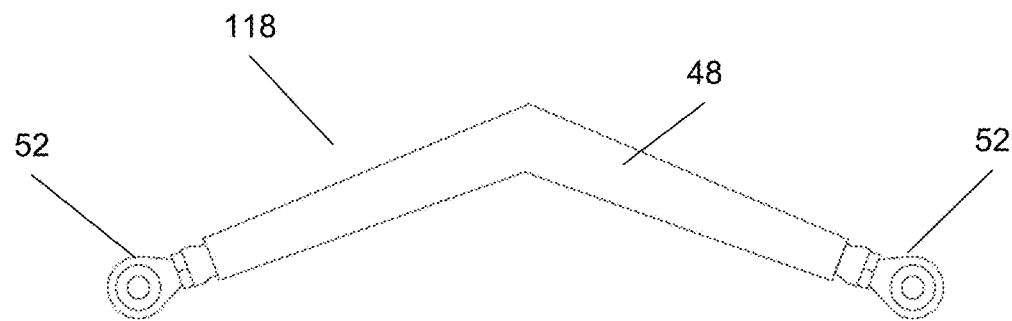
FIG. 5 is a perspective view of a lower link assembly.
Figure 12:
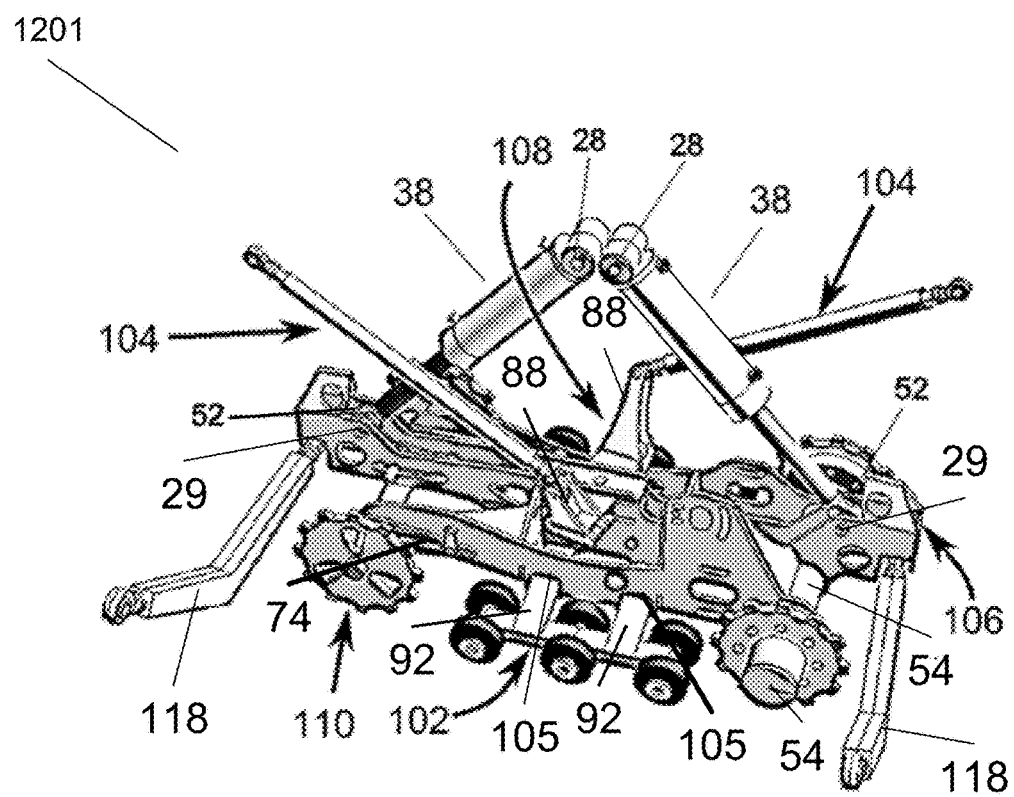
FIG. 12 is a perspective view of a linkage system including devices for lifting and upper link assemblies attached to a partial assembly of the load management system including the roller assembly, the under-carriage frame assembly, a swiveling link assembly, and an idler axle assembly fitted together under-carriage.

With reference to FIG. 5, a lower link assembly 118 is shown. Each lower link assembly 118 attaches to the lower link mount assembly 112 as shown in FIG. 13. A swiveling joint 52 is attached to each end of an angular lower link member 48. FIG. 12 shows an embodiment of how the lower link assemblies 118 and the upper link assemblies 104 fit together.

Figure 6:
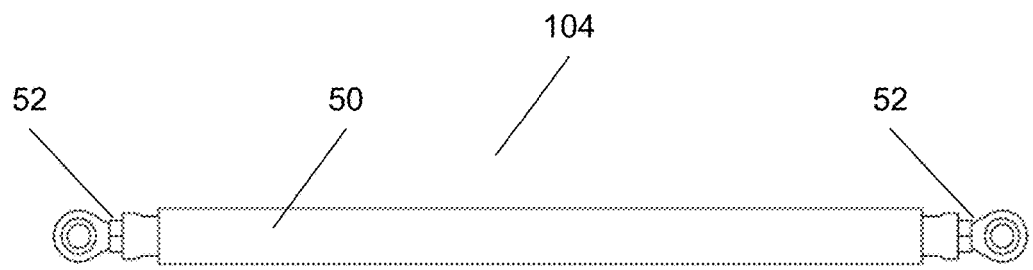
FIG. 6 is a perspective view of an upper link assembly.

With reference to FIG. 6, an upper link assembly member 104 is shown. A swiveling joint 52 attaches to each end of an upper link member 50. The upper link assembly members 104 attach to the swiveling link assembly 108 as shown in FIG. 12. The upper link assembly members 104 attach to the upper link mount and cylinder mount frame 41 as shown in FIG. 13.

With reference to FIG. 7, a swiveling link assembly 108 is shown. Upper and lower plates of swiveling pivot frame 90 are mounted to the under-carriage frame assembly 106 (see FIG. 3B) at upper and lower plates of an under-carriage frame swivel frame pivot mount 78. Pivot frame mounting holes 79 are centrally located in both the upper and lower plates of the under-carriage frame swivel frame pivot mount 78 for mounting the swiveling link assembly 108 as shown. The upper and lower plates of the swiveling frame pivot frame 90 extend outwardly through swiveling frame slots 87 (see FIG. 3B) which limit the range of rotational motion of the swiveling link assembly 108.

With continued reference to FIG. 7, the assembly of the swiveling link assembly 108 and the partially shown under-carriage frame assembly 106 (at an upper and lower under-carriage frame swivel frame pivot mount 78) includes the use of either a pin, rod, or preferably using a threaded bolt 701, a washer 702, and a nut 703 as an inter-assembly fastener. The exemplary fastener 701 secures the swiveling link assembly 108 between the upper and lower plates of the swiveling frame pivot frame 90 allowing it to rotate within certain angular bounds (determined by the swiveling frame slots 87 shown in FIG. 3B) with limited friction based on spacing between the upper and lower plates of the under-carriage frame swivel frame pivot mount 78 in excess of the outer surface separation of the upper and lower plates of the swiveling frame pivot frame 90.

With continued reference to FIG. 7, the exemplary fastener 701 secures the swiveling link assembly 108 by extending through the upper plate of the under-carriage frame swivel frame pivot mount 78 at pivot frame mounting hole 79 extending through the upper and lower plates of the swiveling frame pivot frame 90 at swiveling frame mounting holes 706 and continuing through the lower plate of the under-carriage frame swivel frame pivot mount 78 at pivot frame mounting hole 79, and finally terminating the fastener 701 preferably with the washer 702, and nut 703.

With continuing reference to FIG. 7, swiveling frame arms 704 each include a series of upper linkage mounts 88 for attaching to upper link assembly 104 using exemplary threaded bolt/washer/nut fasteners (not shown).

With reference to FIG. 8A, dual roller pairs on side roller assembly 801 (left and right sides as viewed in FIG. 3A of exemplary roller assembly 102). Each dual roller set with 2 roller wheels 94 each is mounted as a pair on a roller mount or axle with hub 98 which is fixated on a mounting body 96 with the roller wheels separated by the roller mounting body 96 as the side roller assembly 801. Each roller mount or axle with hub 98 is fixated on a roller mounting body 96 by any combination of welds, spot welds, threaded bolts with nuts, rivets, or any other effective fastening means. Although 3 dual roller pairs or sets on each side roller assembly 801 are shown, (left and right sides as viewed in FIG. 3A of exemplary roller assembly 102), there may be more or less than 3 dual roller pairs or sets per side roller assembly 801. The number of dual roller pairs or sets attached to the mounting body 96 are based on the load weight to be supported and size of the load management system section 222 of FIG. 2A. More specifically, the transverse width which relates directly to the extent or length of the continuous tracks 100 as further viewed in FIG. 13.

With reference to FIG. 8B, side view 810 of bow spring 92 is shown. The roller bow spring 92 of FIG. 8B is a bow spring with an unloaded radius of approximately 65 inches (1.65 m) and a length of approximately 23 inches (0.584 m), a width of approximately 2.5 inches (0.0635 m), and a thickness of approximately 0.375 inches (9.525 mm). Each roller bow spring 92 includes a central spring mounting hole 107 for mounting the roller bow spring 92 to the under-carriage frame assembly 106 as shown in FIG. 14. At least two (2) roller bow springs 92 interconnect side roller assemblies 801 in a parallel orientation so that parallel alignment is maintained for the side roller assemblies 801 as shown in FIG. 8A. Each bow spring 92 is attached to the side roller assemblies 801 by any combination of welds, spot welds, threaded bolts with nuts, rivets, or any other effective fastening means. The bow spring 92 material is typically spring steel for strength and flexibility.

With reference to FIG. 9, a lower link mount assembly 112 is shown including a series of fixed lower linkage mounts 46 is attached to a fixed lower linkage frame 44. The lower link assemblies 118 are interconnected with the lower link mount assembly 112 by at least two lower link assemblies 118 as shown in FIG. 13. The link mount assembly 112 includes a fixed lower linkage frame 44 and attached mounting brackets or a series of at least two lower linkage mounts 46.

With reference to FIG. 10, an upper link mount and cylinder mount frame 41 is shown. A series of fixed upper linkage mounts 42 is attached to and built into the upper link mount and cylinder mount frame 41. A lifting mount 40 is attached to and built into the upper link mount and cylinder mount frame 41. The upper link mount and cylinder mount frame 41 provides the basis for mounting a series of at least two devices for lifting 38 (preferably including a hydraulic cylinder) and a series of at least two upper link assemblies 104. An exemplary completed upper link mount and cylinder mount assembly 114 (not shown in FIG. 10, but is shown in FIG. 13) includes the upper link mount and cylinder mount frame 41 with the mounted devices for lifting 38 and the upper link assemblies 104.

With reference to FIG. 11, a rear view of partial assembly 1101 is shown of the load management system 122 including the roller assembly 102, the under-carriage frame assembly 106, a swiveling link assembly 108, drive assembly 120, and an idler axle assembly 110 fitted and assembled together. At least two (2) roller bow springs 92 (2 exemplary bow springs shown) connect the roller assembly 102 to the under-carriage frame assembly 106 at bow spring frame slots 105 and at bow spring mounting holes 107 (not shown in FIG. 11 but shown in FIG. 14).

With continued reference to FIG. 11, the swiveling link assembly 108 attaches to the under-carriage frame assembly 106 preferably using a pin or bolt (not shown) at frame pivot mount 78 through swiveling frame mounting hole 79.

With continued reference to FIG. 11, the drive assembly 120 attaches to the under-carriage frame assembly 106 as shown. The idler axle assembly 110 attaches to the under-carriage frame assembly 106 using inner brackets 70 and outer idler brackets 74 as shown.

With continued reference to FIG. 11, the jack shaft 66 of drive assembly 120 is shown passing through jack shaft passageway slots 81 of the frame assembly 106.

With continued reference to FIG. 11, a jack shaft bearing 64 is shown mounted on jack shaft bearing mounting slots 89 (not shown) of the frame assembly 106.

With reference to FIG. 12, partial assembly front view 1201 is shown wherein the lower link assemblies 118 attach to the under-carriage frame assembly 106 as shown and fitted for mounting to lower link mount and cylinder mount assembly 112 as shown in FIG. 13. The upper link assemblies 104 attach to the swiveling link assembly 108 at upper linkage mounts 88 as shown (and fitted for mounting to upper link mount and cylinder mount frame 41 as shown in FIG. 13). A lifting bushing 28 is attached to each device for lifting 38 (preferably including a hydraulic cylinder) for an upper link mount and cylinder mount frame 41 connection as shown in FIG. 13 and a swiveling joint 52 on the other end for a lower connection. The at least one device for lifting 38 lower connection attaches to the under-carriage frame assembly 106 at lift mount holes 29 as shown in FIG. 12.

With continuing reference to FIG. 12, the idler axle assembly 110 attaches to the under-carriage frame assembly 106 using inner brackets 70 (not shown) and outer idler brackets 74 as shown. At least two (2) roller bow springs 92 (2 exemplary springs shown) connect the roller assembly 102 to the under-carriage frame assembly 106 at bow spring frame slots 105 and at bow spring mounting holes 107 (not shown in FIG. 12 but shown in FIG. 14).

With continuing reference to FIG. 12, the drive axle with hub 54 is shown intersecting the undercarriage frame assembly 106.

With reference to FIG. 13, view 1301 shows an unlocked, extended, and deployed (continuous tracks 100 in contact with ground or terrain surface line 269) and a partially illustrated trailer lifted by load management system 122 (in an extended configuration 123 as further shown in FIG. 2B.

With continued reference to FIG. 13, a series of at least two lower link assemblies 118 is shown whereby each lower link assembly 118 interconnects the lower link mount assembly 112 (at a fixed lower linkage mount 46 of the associated fixed lower linkage frame 44) to the undercarriage frame assembly 106 as shown. The fixed lower linkage frame 44 is fixated to a trailer frame 124 by any combination of welds, spot welds, threaded bolts with nuts, rivets, or any other effective fixating or fastening means thereby making it fixed.

With continued reference to FIG. 13, an exemplary completed upper link mount and cylinder mount assembly 114 is shown including the upper link mount and cylinder mount frame 41 with mounted devices for lifting 38 and the upper link assemblies 104.

With continued reference to FIG. 13, in the general case or embodiment for the completed upper link mount and cylinder mount assembly 114; the upper link mount and cylinder mount frame 41 includes a series of at least two upper link assemblies 104, each including an upper link member 50 as a linking member terminated at each end with a swiveling joint 52 as shown in FIG. 6. Each upper link assembly 104 interconnects the upper link mount and cylinder mount frame 41 (a series of at least two fixed upper linkage mounts 42) to a swiveling link assembly 108. The swiveling link assembly 108 attaches to the under-carriage frame assembly 106 with a threaded bolt in combination with a nut and washer as shown in FIG. 7.

With continued reference to FIG. 13, a series of at least two devices for lifting 38 (preferably including a hydraulic cylinder), each with a swiveling joint 52 attached to the undercarriage frame assembly 106 and a lifting bushing 28 as shown in FIG. 12 attached to the upper link mount and cylinder mount frame 41 at a lifting mount 40 as shown in FIG. 13.

Figure 16:
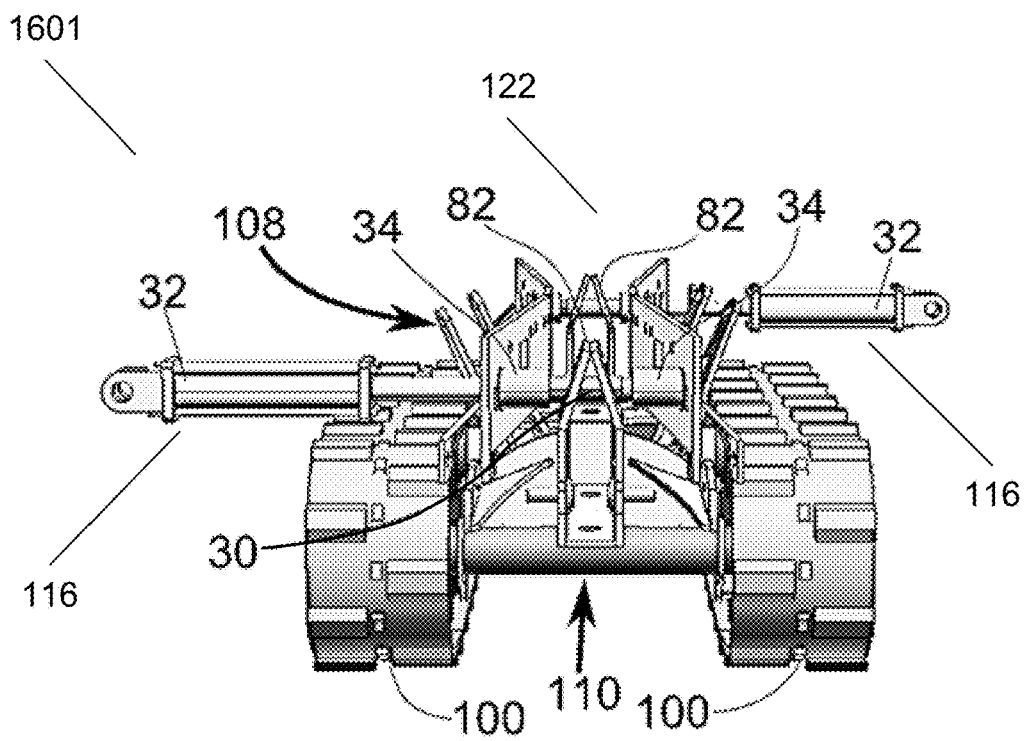
FIG. 16 is a perspective view of a load management system in the locked position.
Figure 17:
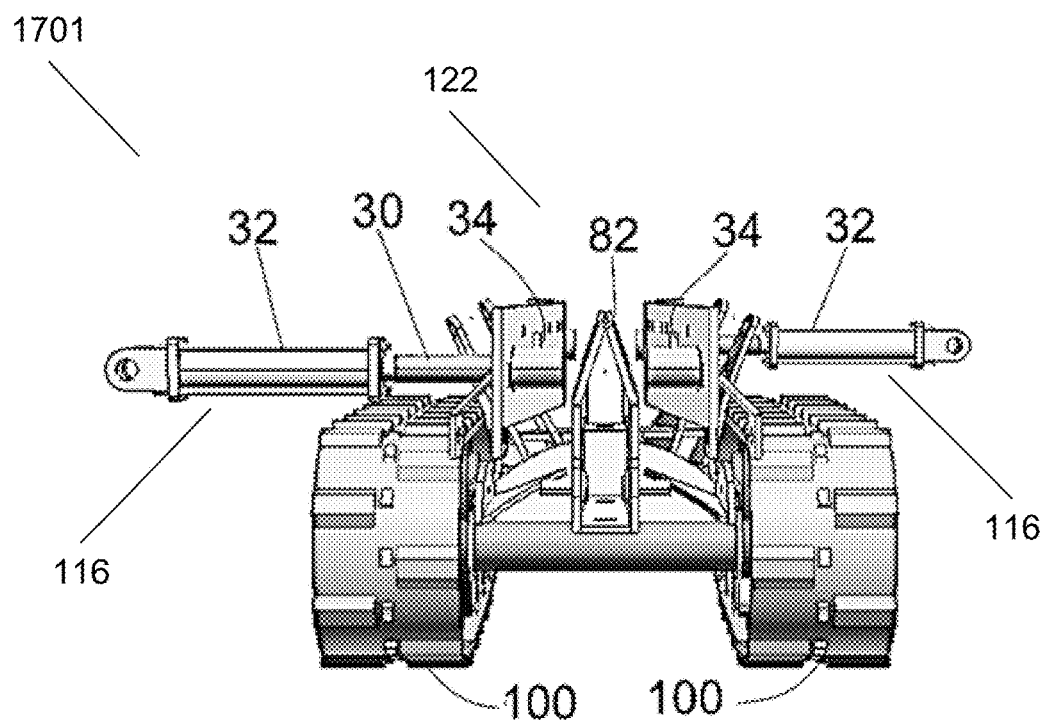
FIG. 17 is a perspective view of a load management system in the unlocked position.

With continued reference to FIG. 13, a series of at least two lock assemblies 116 attach to the upper link mount and cylinder mount frame 41 (an exemplary lock assembly 116 is shown in FIG. 13 and the two preferable lock assemblies 116 are shown in FIGS. 16 and 17). The upper link mount and cylinder mount frame 41 attaches to a trailer frame 124 at a pair combination of locations 43 at each end of the upper link mount and cylinder mount frame 41 by any or a paired combination of welds, spot welds, threaded bolts with nuts, rivets, or any other effective fastening means.

With continued reference to FIG. 13, the partially illustrated trailer includes wheels/tires 292, axle/hub 290 for a near set of wheels/tires 292, and trailer frame 124. The load management system 122 (in extended configuration 123 as shown in FIG. 2B) has the capability to move the trailer sideways (orthogonal to the normal trailer directions set by wheel/tires 292) in this configuration. A set of continuous tracks 100 (preferably rubber) fit on the drive assembly 120 and the idler axle assembly 110. The continuous tracks 100 can be of any material or type (rubber or metal) and sprocket driven or friction driven. The roller assembly 102 keeps pressure on the continuous tracks 100 when they are lowered based on one or more extensions of the devices for lifting 38 (each preferably including a hydraulic cylinder). The overall width W 225 is wider than the continuous tracks 100 width TW 230 shown in FIG. 13 due to the locations of the lower link assemblies 118 extending wider than the continuous tracks 100 width TW 230. The ground contact length of the continuous tracts 100 is approximately equal to the width TW 230 minus the sum of the radius of sprocket 72 of idler axle assembly 110 and the radius of sprocket 62 of drive assembly 120.

With reference to FIG. 14, a bottom view of a partial assembly 1401 is shown including the roller assembly 102, the under-carriage frame assembly 106, the swiveling link assembly 108, the idler axle assembly 110, and the drive assembly 120. The at least two (2) roller bow springs 92 each include a bow spring mounting hole 107 for mounting the roller assembly 102 to under-carriage frame assembly 106, the combination shown in FIG. 14. The at least two (2) roller bow springs 92 are attached to the under-carriage frame assembly 106 at bow spring mounting hole 107 locations by any combination of welds, spot welds, threaded bolts with nuts, rivets, or any other effective fastening means. The at least two (2) roller bow springs 92 are further secured by the under-carriage frame assembly 106 at bow spring frame slots 105.

Figure 15A:
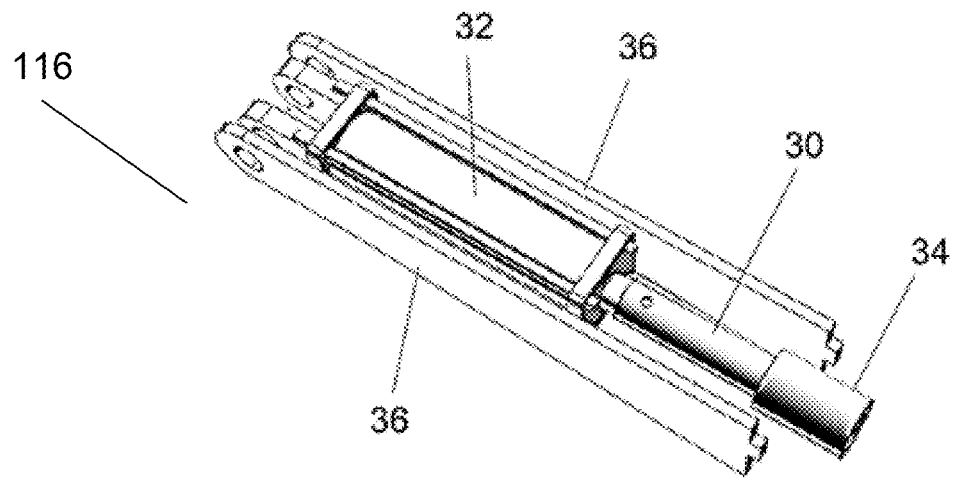
FIG. 15A is a perspective view of a locking pin mechanism in the unlocked position.

With reference to FIG. 15A, a lock assembly in unlocked position 116 is shown. A locking pin actuation device (preferably a hydraulic cylinder) 32 is attached to a series of locking pin mounts 36 for locking pin 30. The locking pin actuation device 32 is attached to a proximal end of locking pin 30. The locking assembly 116 is shown in FIG. 15A in a disengaged or unlocked state with the locking pin 30 in the correspondingly retracted position with the distal end of the locking pin not extending through the pair of bushings 34. The lock assembly 116 is attached to the upper link mount and cylinder mount frame 41 as identified in FIG. 13.

Figure 15B:
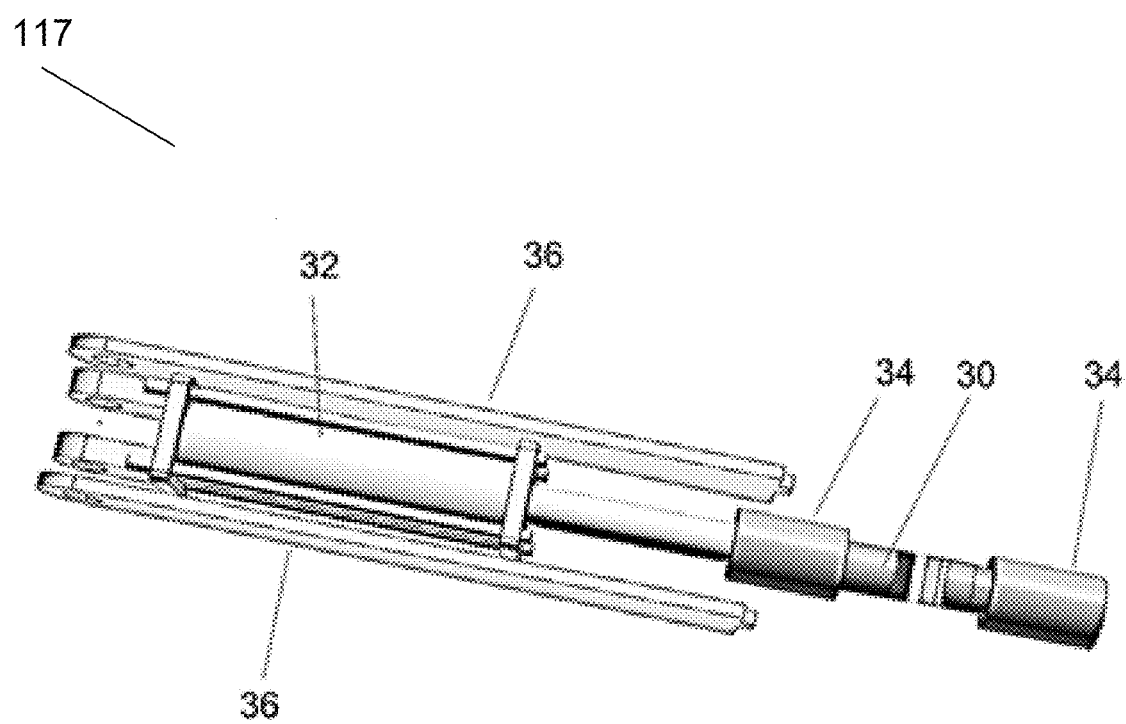
FIG. 15B is a perspective view of a locking pin mechanism in the locked position.

With reference to FIG. 15B, the lock assembly in locked position 117 is shown. A locking pin actuation device (preferably a hydraulic cylinder) 32 is attached to a series of locking pin mounts 36 for locking pin 30. The locking pin actuation device 32 is attached to a proximal end of locking pin 30. The locking assembly shown in locked position 117 in FIG. 15B in an engaged or locked state with the locking pin 30 in the correspondingly extended position with the distal end of the locking pin extending through the pair of bushings 34.

With continuing reference to FIG. 15B, when the pin locking actuation device 32 engages or extends, the distal end of the locking pin 30 also extends and slides through a series of bushings 34 as shown in FIG. 16.

With reference to FIG. 16, configuration 1601 of the load management system 122 is shown with a locking system in locked configuration including the lock assembly 116 in the locked position with the device for locking pin (hydraulic cylinder) 32 actuated and extended. The locking tabs 82 have locking pin transverse holes 91 (not shown) used to accept locking pins 30 as shown engaged in the locked position with the distal end of the locking pin extending through the pair of bushings 34. This embodiment of the load management system 122 includes a continuous track 100 set of 2 tracks for traction and stability which are shown mounted on idler axle assembly 110.

With continuing reference to FIG. 16, once a load management system 122 has retracted, at least one locking cylinder 32 (preferably 2) can be actuated and positively lock the retracted load management system 122 in a fixed position using lock assemblies 116. This locking capability in retracted position of the load management system 122 is essential because if hydraulic cylinders are used for lifting or otherwise they might inadvertently leak internally and cause the load management system 122 to sag and drag on the road or terrain. This unwanted extension or sagging of the load management system 122 could destroy the continuous tracks and damage the road or worse; cause a vehicular accident leading to injuries and loss of life. With continuing reference to FIG. 16, the upper link assemblies 104 (shown in FIG. 12) attach to the swiveling link assembly 108.

With reference to FIG. 17, configuration 1701 of the load management system 122 is shown with a locking system in unlocked configuration including the lock assembly 116 in the unlocked position with the device for locking pin (hydraulic cylinder) 32 deactivated and retracted. The locking tabs 82 have locking pin transverse holes 91 (not shown) used to accept locking pins 30 as shown disengaged in the unlocked position with the distal end of the locking pin not extending through the pair of bushings 34. This embodiment of the load management system 122 is shown fitted with a set of two continuous tracks 100 for traction and stability.

Figure 18:
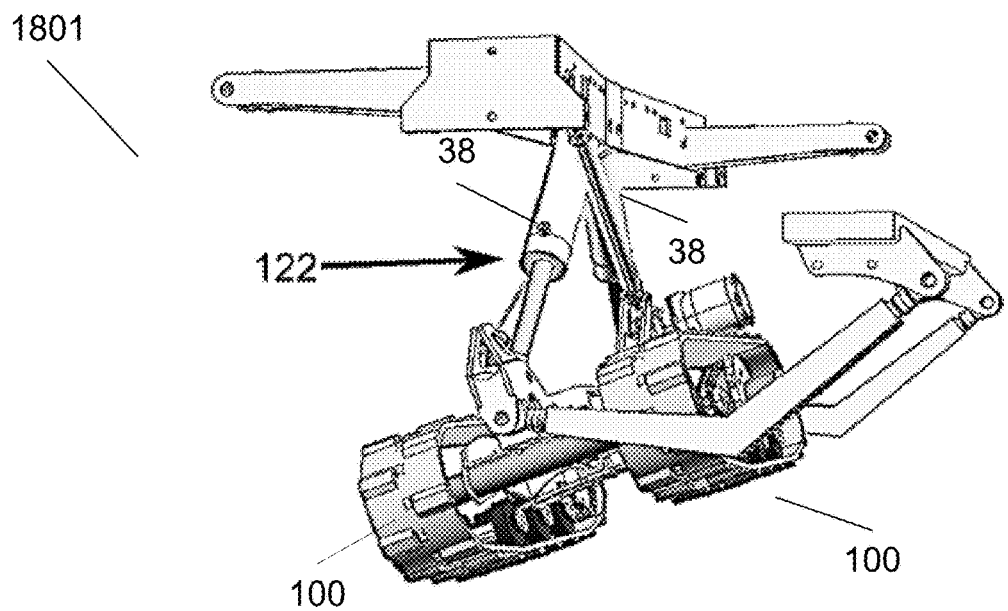
FIG. 18 is a perspective view of a load management system in the down swiveled position.

With reference to FIG. 18, an orientation 1801 of the load management system 122 is shown oriented to move a trailer sideways in the down swiveled position with contact on the terrain maintained by continuous tracks 100. This configuration is associated with keeping a load (e.g., shed) leveled during sideways motion or when stationary on transverse (side of hill for example) uneven or unlevel terrain. This orientation is possible when both devices for lifting 38 are extended, typically using hydraulic cylinders called lifting cylinders.

Figure 19:
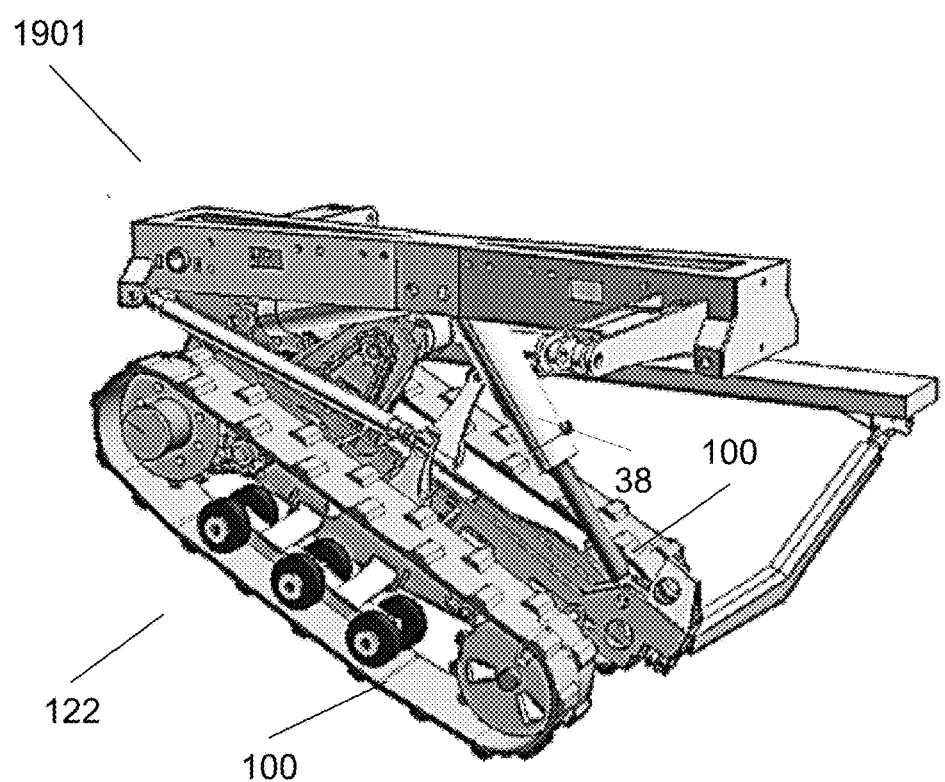
FIG. 19 is a perspective view of a load management system with one side extended and one side retracted.

With reference to FIG. 19, an orientation 1901 of the load management system 122 is shown configured to move a trailer sideways with one device for lifting 38 extended and one device for lifting 38 retracted (not shown) with contact on the terrain maintained by continuous tracks 100. This configuration is associated with keeping a load (e.g., shed) leveled during sideways motion or when stationary on longitudinal (downhill for example) uneven or unlevel terrain.

Figure 20:
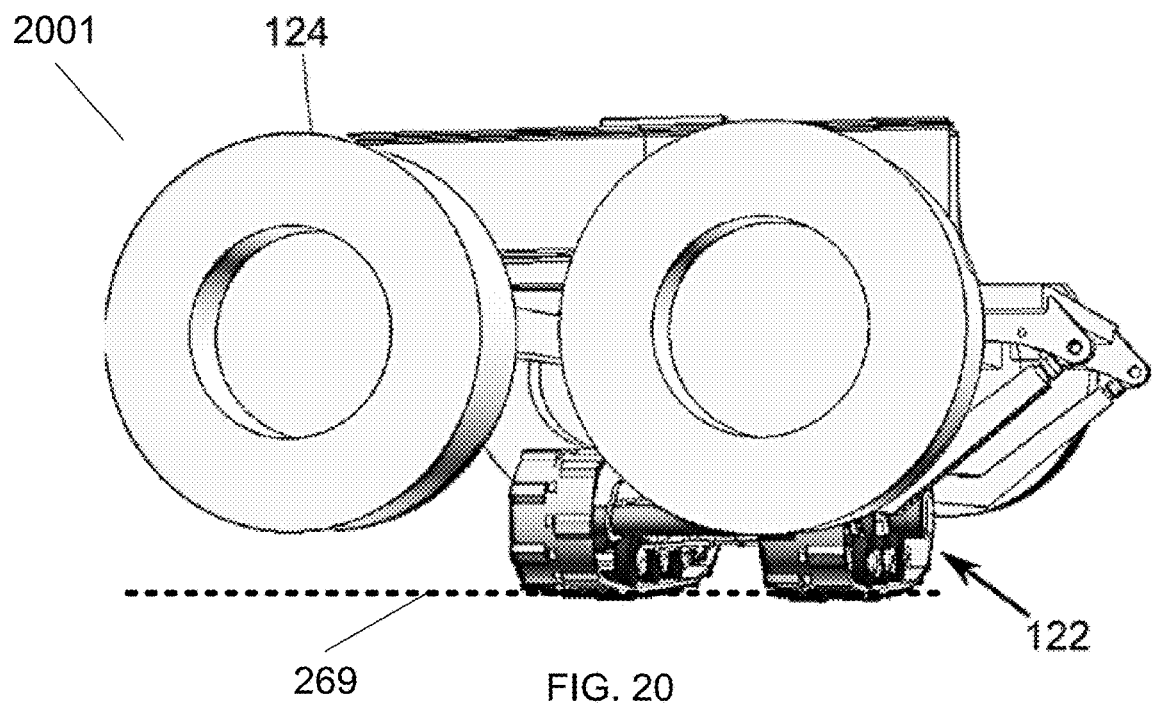
FIG. 20 is a perspective view of a load management system lifting a trailer (partial view of trailer shown).

With reference to FIG. 20, a configuration 2001 of the load management system 122 lifting a trailer is shown configured to move trailers sideways over ground or terrain surface line 269 while lifting a trailer by the trailer frame 124.

Figure 21:
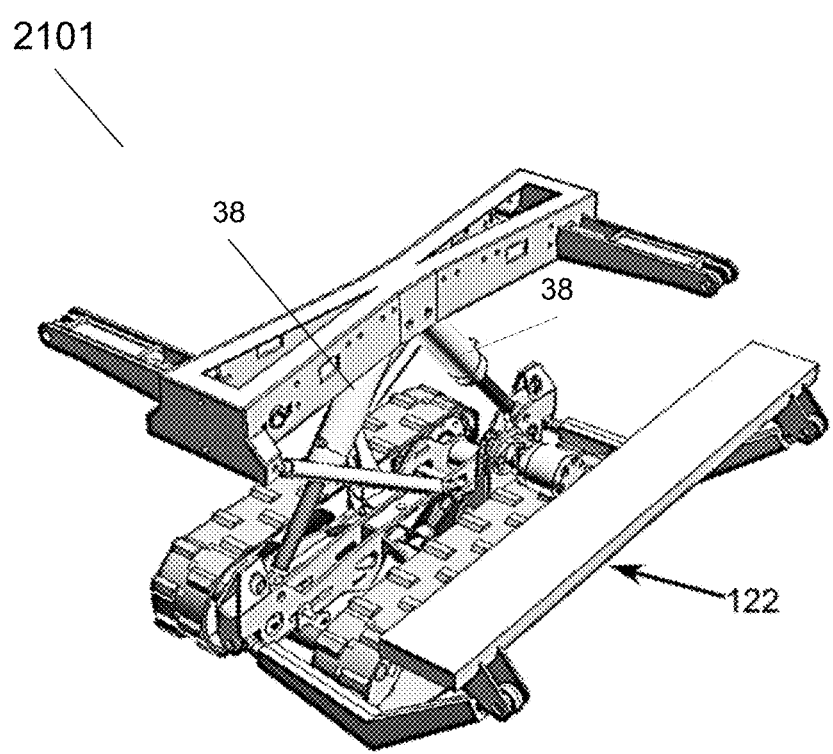
FIG. 21 is an isometric view of a load management system in the extended position.

With reference to FIG. 21, a configuration 2101 of the load management system 122 is shown configured with all devices for lifting 38 extended.

A method using the load management system 122 is described as follows with regard to unloading:

A loaded trailer equipped with a load management system 122 is onloaded, transferred, positioned, and offloaded at an offloading site. An operator activates a series of aforementioned switches which activates lifting devices 38 and a drive assembly 120 that make onloading and offloading very simple and effective.

The operator can lift the trailer off the ground by extending the load management system 122 in a manner so that the load remains level when lifted. As the load management system 122 (in extended configuration 123 as shown in FIG. 2B) is carrying the trailer it can conform to uneven ground by its swiveling joints on the end of each link. The lower links (lower link assembly 112) keep it from moving front to back while the upper links (upper link assembly 104) keep it from moving side to side. Once the trailer tires are off the ground, a hydraulic valve can be activated in the same manner and a series of one or more motor drives the continuous tracks 100. This will drive the trailer left to right (orthogonal) or sideways relative to the elongated trailer direction. The rear of the trailer will move over while it pivots on the trailer hitch. This will allow the trailer to be positioned where the operator wants it for offloading or onloading operations.

Furthermore, for load leveling controls during offloading or onloading operations, each end (continuous tracks 100) of the load management system 122 can be retracted or extended (configuration 123 as shown in FIG. 2B) independently by lifting devices 38 (preferably hydraulic cylinders). The load leveling control is used for onloading and offloading operations to reduce damage to the loads and accidental toppling of the loads.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A load management system comprising:
   a roller assembly further comprising:
      an at least two side roller assemblies further comprising,
         a set of at least three dual roller pairs fixated and distributed approximately with equal separation on a roller mounting body, each said roller pair comprising two rollers attached to a common roller axle and hub with said roller hub attached to said roller mounting body,
         a series of at least two parallel aligned roller bow springs attached orthogonally to the at least two side roller assemblies;
   an under-carriage frame assembly comprising a series of elongated frame main members further comprising:
      a pair of under-carriage locking tabs on opposing ends of the elongated frame main members, each locking tab comprising a locking pin transverse hole to accept a locking pin with the load management system disengaged,
      a series of under-carriage cross members attached to the series of elongated frame main members,
      a series of at least two under-carriage frame lift mount holes, each said frame lift mount hole for mounting a device for lifting,
      an under-carriage frame swivel frame pivot mount for mounting a swiveling link assembly,
      a series of drive axle mounting holes for mounting a drive axle with hub through the series of elongated frame main members,
      a pair of under-carriage lower lift mounts for attaching the under-carriage frame assembly to a lower link assembly,
      a series of jack shaft bearing mounting slot sets, each set of mounting slot sets comprising two slots for mounting jack shaft bearings to the series of elongated frame main members,
      a series jack shaft passageway slots for a jack shaft passage through the series of elongated frame main members,
      a series of idler axle mounting slots for attaching a series of inner brackets to mount an idler axle;
   an idler axle assembly further comprising:
      an idler to frame coupling hub with axle rotatively attached to the under-carriage frame assembly for securing the idler axle assembly,
      a tensioning device attached to the idler frame coupling hub, said tensioning device for tightening or loosening a set of continuous tracks,
      an idler tensioning rod communicating force from the tensioning device through an idler tensioning coupling hub with axle rotatively attached to an inner bracket attached to an idler axle with hub,
      a set of at least two continuous track idler sprockets attached to the idler axle with hub,
      a set of at least two outer idler brackets attached to the idler axle with hub for mounting the idler axle assembly to the under-carriage frame assembly;
   a drive assembly further comprising:
      a torque supply device communicates torque to a primary drive chain sprocket,
      a primary chain communicates torque from the primary drive chain sprocket to a primary jack shaft sprocket,
      a jack shaft dividedly communicates torque from the primary jack shaft sprocket to a series of at least two jack shaft roller sprockets,
      a series of at least two roller chains communicates a divided torque from the series the at least two jack shaft roller sprockets to a series of at least two roller chain sprockets,
      a drive axle with hub communicates a divided torque from the at least two roller chain sprockets to continuous track drive sprockets,
      a series of at least two continuous tracks convert the divided torque from the at least two continuous track drive sprockets to transverse linear motion with at least one of the continuous tracks at a ground contact point;
   the lower link assembly further comprising:
      a fixed lower linkage frame for attaching the lower link assembly to a trailer frame, comprising a series of at least two lower linkage mounts,
      a series of at least two lower link assemblies interconnecting said lower linkage frame at said lower linkage mounts to the under-carriage frame assembly at the under-carriage locking tabs;
   an upper link mount and cylinder mount assembly further comprising:
      a series of at least two fixed upper linkage mounts,
      a lifting mount for mounting at least two devices for lifting,
      a series of at least two lock assemblies, each comprising:
         a locking pin,
         a hydraulic cylinder for locking and unlocking,
         a locking pin mount for mounting the locking pin,
         a pair of bushings for guiding the locking pin through the upper link mount and cylinder mount assembly,
      a series of at least two upper link assemblies, each comprising:
         an upper link member,
         a swiveling joint terminating the upper link member and interconnecting the upper link mount and cylinder mount frame to a swiveling link assembly attached to the under-carriage frame assembly,
      a series of at least two devices for lifting, each comprising:
         a hydraulic cylinder, a swiveling joint for attaching the device for lifting to the undercarriage frame assembly,
a lifting bushing for attaching the device for lifting to the upper link mount and cylinder mount frame at a lifting mount,
a paired combination of upper link mount and cylinder mount frame attachments to a trailer frame at each end of the upper link mount and cylinder mount frame; and
a load management control system further comprising,
a wireless control unit,
a communication from the wireless control unit to a wireless receiver unit for conversion to wired electrical signals,
a local control unit receiving wired electrical signals and local switch signals for controlling a hydraulic system,
a load management mechanical system controlled by the hydraulic system and other mechanical settings.

* * * * *